United States Patent [19]

Kettell et al.

[11] 4,423,804
[45] Jan. 3, 1984

[54] FRICTION CLUTCHES

[75] Inventors: John Kettell; David Anderson, both of Sheffield, England

[73] Assignee: Laycock Engineering Limited, Sheffield, England

[21] Appl. No.: 279,651

[22] Filed: Jul. 2, 1981

[30] Foreign Application Priority Data

Jul. 4, 1980 [GB] United Kingdom ................ 8022012

[51] Int. Cl.$^3$ ............................................. F16D 13/71
[52] U.S. Cl. ............................. 192/109 R; 192/70.18; 192/89 B
[58] Field of Search ............... 192/109 R, 99 A, 99 B, 192/89 B, 109 A, 109 B, 70.18, 70.29, 70.3

[56] References Cited

U.S. PATENT DOCUMENTS

| 2,541,611 | 2/1951 | Reed | 192/99 B X |
|---|---|---|---|
| 3,554,342 | 1/1971 | Spokas | 192/70.18 |
| 4,069,905 | 1/1978 | de Gennes | 192/70.18 X |
| 4,122,229 | 10/1978 | Maucher et al. | 192/70.18 |
| 4,317,435 | 3/1982 | Kohlhage | 192/70.18 X |
| 4,362,230 | 12/1982 | Corral | 102/109 R |

FOREIGN PATENT DOCUMENTS

| 2607925 | 9/1977 | Fed. Rep. of Germany ... 192/70.18 |
|---|---|---|
| 1394118 | 5/1975 | United Kingdom ............ 192/109 R |
| 2,032,017 | 4/1980 | United Kingdom ............ 192/109 R |

Primary Examiner—John E. Murtagh
Assistant Examiner—Richard E. Chilcot, Jr.
Attorney, Agent, or Firm—Merriam, Marshall & Bicknell

[57] ABSTRACT

A friction clutch assembly incorporates a pressed steel cover member 11 having an annular pressure plate 13 arranged within a recess 12 in the cover 11. Drive straps 21 connect lugs 17 of the pressure plate to the cover and allow relative axial movement between cover and pressure plate. A diaphragm spring 22 provides a clutch clamping load tending to urge the pressure plate out of the recess in the cover. Stops 23, integral with the cover and set back from the mounting flange 14 of the cover, are arranged to engage directly the lugs 17 of the pressure plate to prevent excess movement of the pressure plate which could deflect the drive straps 21 excessively.

2 Claims, 3 Drawing Figures

FRICTION CLUTCHES

BACKGROUND TO THE INVENTION

This invention relates to a clutch assembly comprising a recessed cover member, a pressure plate, resilient flexible means connecting the cover member and the pressure plate together for torque transmission whilst permitting relative axial movement therebetween (such axis being the axis of rotation of the clutch assembly when in use) and spring means operative between the cover member and pressure plate to bias the pressure plate towards a position corresponding, when the assembly is in use, to the engaged position. Such a clutch assembly will hereinafter be referred to as a clutch assembly of the kind specified.

One form of clutch assembly of the kind specified commonly used has a recessed cover member which is provided with a peripheral flange adapted to be bolted to the flywheel of an internal combustion engine with which the clutch assembly is to be used. The pressure plate is accommodated within the recess of the cover, the spring means biasing the pressure plate outwardly thereof to engage a driven plate received between it and the flywheel. When the cover member of the assembly is secured to the flywheel, the range of permitted free movement of the pressure plate within the cover is limited because of its engagement with the driven plate, but this constraint is not present when the assembly of the cover and pressure plate is not connected to the flywheel. Whilst movement of the pressure plate into the cover member is restrained by the spring means, movement of the pressure plate outwardly of the cover member is not constrained other than by the flexible means connecting it to the cover member.

This lack of constraint on movement of the pressure plate and the cover member can lead to problems during handling of the clutch assembly. In particular, if the assembly is placed or dropped onto a surface, with the flange of the cover member downward, the flange will normally contact the surface first. The pressure plate will then have to move down within the cover member before it contacts the surface itself, which can give rise to overstressing of the flexible means connecting it to the cover member. The pressure plate typically is a relatively heavy component, which can aggravate the problem since it possesses appreciable inertia if, the clutch assembly is dropped or roughly handled. The flexible means is already, when the clutch assembly is not in use, in a relatively highly stressed condition because of the displacement of the pressure plate outwardly of the cover under the influence of the spring means.

This over stressing of the flexible means, which in a typical example is made up of three drive straps in the form of leaf springs, can cause the flexible means to be deflected beyond the elastic limit so that they take on a permanent set. Then, in the installed clutch, there is a possibility that on clutch release the flexible means wil hold the pressure plate in engagement with the clutch driven plate and so cause clutch drag.

It has already been proposed in U.S. Pat. No. 4,122,939 to overcome this problem by providing an extension to the drive strap beyond its engagement with the pressure plate and to provide a lug on the cover to act as a stop to engage with the extended drive strap. A difficulty which can arise with this proposed solution to the problem is that the bending load applied to the extension of the drive strap when the clutch is dropped can still result in distortion of the normally operative part of the drive strap or distortion of the attachment between the drive strap and the pressure plate. Such distortions can in themselves lead to clutch drag.

It has also been proposed in U.K. Patent Specification No. 2,032,017A to provide extensions on the mounting flange of the cover in the region of the drive straps, to engage the pressure plate drive lugs associated with the drive straps behind these extensions and thereby restrict the movement of the pressure plate in a direction out of the cover. We have discovered that this proposal is not entirely satisfactory because on occasions, a cover assembly which has been roughly handled cannot be mounted accurately on a flywheel, due to the fact that the mounting flange and in particular the extensions can be distorted towards the cover by the pressure plate.

SUMMARY OF THE INVENTION

An object of the present invention is to overcome the problem of distortion of the flexible means, (the drive straps) as can occur when the clutch is dropped, in a more effective manner.

The present invention provides a clutch assembly comprising a recessed cover member having a mounting flange for engagement with a flywheel, a pressure plate, flexible resilient means connecting outwardly directed lugs of the pressure plate to the cover member for torque transmission whilst permitting relative axial movement therebetween, spring means operative between the cover member and pressure plate to bias the pressure plate towards a position corresponding, when the assembly is in use, to the engaged position and stop means constituted by abutments on the cover arranged to engage directly with the lugs of the pressure plate for preventing movement of the pressure plate in a direction out of the recess to an extent which would over stress the flexible means, characterised in that the abutments are set back from the mounting flange towards the pressure plate.

When the clutch is dropped in such a way that the pressure plate impacts against one of the abutments, it tends to distort the abutment towards the flywheel face. This distortion is not sufficient to overstress the flexible means so from that point of view the clutch remains entirely satisfactory. Also, because the abutments are set back from the mounting flange, their distortion does not interfere with the subsequent mounting of the clutch cover on a flywheel.

Preferably the lugs on the pressure plate extend out beyond the inner edge of the mounting flange into gaps in the flange, the part of the cover forming the recess extends out over the lugs and the abutments on the cover project inward from these extensions of the recess.

By this means, a simple and direct positive stop remote from the mounting flange is provided which guards effectively against excessive pressure plate movement in a direction out of the cover.

BRIEF DESCRIPTION OF THE DRAWINGS

The invention will now be described by way of example with reference to the accompanying drawings in which.

DESCRIPTION OF PREFERRED EMBODIMENTS

Figure 1:
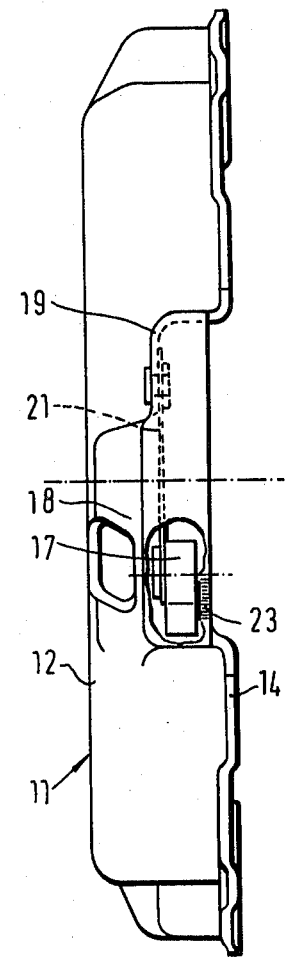
FIG. 1 is a side elevation of a clutch according to the invention.
Figure 2:
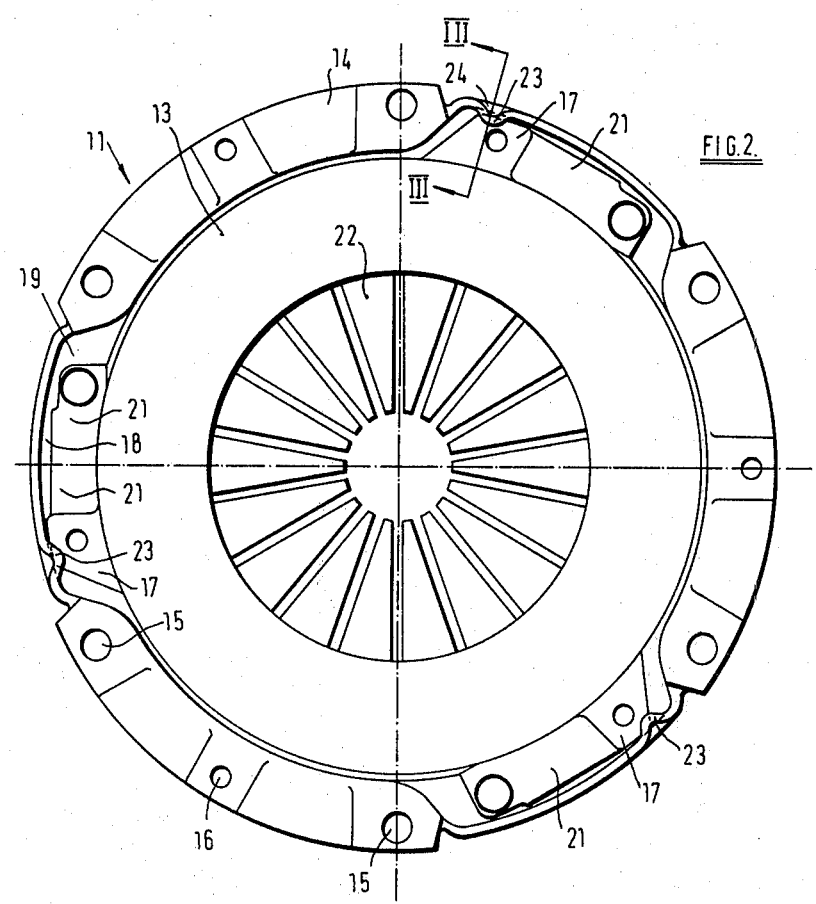
FIG. 2 is a rear elevation of the clutch shown in FIG. 1.

The clutch comprises a cover 11 which is a generally annular steel pressing. The major part of the cover is in the form of a recess 12 within which an annular pressure plate 13 is carried. The cover also incorporates an external peripheral mounting flange 14 by means of which the clutch can in use be mounted to a flywheel through bolt holes such as 15 and locating dowel holes such as 16. The pressure plate has three externally projecting lugs 17 intended for connecting the pressure plate to the cover. These lugs 17 are located within extensions 18 of the recess 12 which extend out over the lugs 17. The extensions interrupt the mounting flange 14 so that this flange is not continuous. Each extension has one portion which extends over its lug 17 with a clearance and also has a more shallowly recessed area 19 beside the lug 17.

The pressure plate is secured to the cover by resilient means constituted by three drive straps 21 each of which extends from a lug 17 to the corresponding portion 19 of the cover. Rivets secure the ends of the drive straps of the cover and to the lug. Each drive strap is normally constituted by two leaf spring laminations held together by the rivets. The three drive straps 21 locate the cover with respect to the pressure plate against relative rotation and relative radial movement. The drive straps do however allow relative axial movement between the cover and pressure plate and act as leaf springs tending to hold the pressure plate into the recess in the cover.

The clutch is also provided with a conventional diaphragm spring 22 which acts between the cover and the pressure plate to urge the pressure plate in a direction out of the recess in the cover so that in use the pressure plate clamps a driven plane (not shown) between the pressure plate and an engine flywheel (not shown) on which the cover is mounted by flanges 14. The clutch is also provided with a release mechanism for removing the clamping force of the diaphragm spring on the pressure plate. Operation of the release mechanism removes the clamping load on the driven plate and so releases the clutch. To ensure positive release of the clutch, the leaf spring characteristics of the drive straps 21 are used to positively retract the pressure plate from the driven plate. Details of the mounting of the diaphragm spring 22 and of the release mechanism are not shown or described in detail because they are entirely conventional and are not relevant to the invention.

The clutch as thus far described, before mounting in an engine flywheel, has the diaphragm spring 22 acting on the pressure plate 13 without the resistance of a driven plate so that the pressure plate moves in a direction out of the cover to a greater distance than when the clutch is installed with a driven plate on a flywheel. This deflects the drive straps 21 very close to their elastic limit. Thus, if the clutch were to be dropped or otherwise mishandled in such a way that the pressure plate, which is a heavy casting, tends to be displaced further out of the recess in a cover, there would be a danger of deflecting the drive straps beyond their elastic limit. The associated permanent set of the drive straps could then make them ineffective as leaf springs for retracting the pressure plate from a driven plate when the clutch is installed and the clamping load of the diaphragm spring 22 is released.

Figure 3:
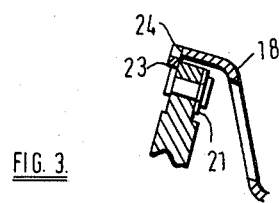
FIG. 3 is a part section on the line III—III of FIG. 2.

To guard against this, stop means constituted by abutments 23 are provided. These abutments are formed by shearing local areas of the projection 18 of the cover at 24 as best seen in FIG. 3 and stretching and bending the edge of the cover into the path of the lug 17. The positive engagement of these stops with the lugs of the pressure plate result in an effective direct constraint on excessive movement of the pressure plate with the result that the drive straps 21 are effectively protected against excessive distortion. As seen in FIG. 1, the abutments 23 are set back from the mounting flange 14 towards the pressure plate. This ensures that, if the cover assembly is dropped and the pressure plate impacts on an abutment 23 sufficiently hard to distort it, the abutment does not protrude beyond the mounting face 14 of the cover and so does not prevent accurate mounting of the cover assembly on the flywheel. Because the abutment is well away from the mounting flange and separated therefrom by curved and hence stiff parts of the cover pressing, there is little change of distortion other than local distortion of the abutment and in particular of distortion of the flange.

We claim:

1. A clutch assembly comprising a cover member having a mounting flange adapted to be connected to a flywheel, and an annular lateral wall and a rear wall together defining a recess, a pressure plate disposed within said recess and having outwardly extending lugs, flexible resilient means connecting said lugs to the cover member for torque transmission while permitting relative axial movement therebetween, spring means operative between the cover member and the pressure plate to bias the pressure plate out of said recess towards a position corresponding, when the assembly is in use, to the engaged position, and abutments on the cover member arranged to engage said lugs to prevent movement of the pressure plate out of the recess to an extent which would overstress the flexible means, said abutments comprising portions of said annular lateral wall each sheared and displaced inwardly therefrom while remaining connected thereto at opposite ends of the portion circumferentially of the cover member, said portions being set back from said mounting flange towards said rear wall.

2. A clutch assembly according to claim 1 wherein said lugs extend out beyond the inner periphery of said mounting flange into gaps in said flange, and said annular lateral wall has outwardly disposed portions containing said lugs and in which said abutments are provided.

* * * * *